United States Patent
Choi et al.

(10) Patent No.: US 6,980,603 B2
(45) Date of Patent: Dec. 27, 2005

(54) DIGITAL VSB TRANSMISSION SYSTEM

(75) Inventors: In Hwan Choi, Seoul (KR); Young Mo Gu, Seoul (KR); Kyung Won Kang, Seoul (KR); Kook Yeon Kwak, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 704 days.

(21) Appl. No.: 09/991,442

(22) Filed: Nov. 16, 2001

(65) Prior Publication Data

US 2002/0154709 A1    Oct. 24, 2002

(30) Foreign Application Priority Data

Apr. 20, 2001 (KR) .............................. 2001-21446

(51) Int. Cl.⁷ .................. H04L 27/04; H04L 27/12; H04L 27/20
(52) U.S. Cl. ............... 375/295; 375/301; 370/535; 714/792
(58) Field of Search ............... 375/265, 270, 375/300, 301, 320, 321, 295; 348/495, 469; 370/535; 714/792, 786

(56) References Cited

U.S. PATENT DOCUMENTS

| | | | |
|---|---|---|---|
| 5,087,975 A | 2/1992 | Citta et al. | |
| 5,233,630 A | 8/1993 | Wolf | |
| 5,488,691 A | 1/1996 | Fuoco et al. | |
| 5,555,024 A | 9/1996 | Limberg | |
| 5,563,884 A | 10/1996 | Fimoff et al. | |
| 5,583,889 A | 12/1996 | Citta et al. | |
| 5,600,677 A | 2/1997 | Citta et al. | |
| 5,602,595 A | 2/1997 | Citta et al. | |
| 5,629,958 A | 5/1997 | Willming | |
| 5,636,251 A | 6/1997 | Citta et al. | |
| 5,636,252 A | 6/1997 | Patel et al. | |
| 5,706,312 A | 1/1998 | Wei | |
| 5,831,690 A | 11/1998 | Lyons et al. | |
| 5,923,711 A | 7/1999 | Willming | |
| 5,946,047 A | 8/1999 | Levan | |
| 5,966,401 A * | 10/1999 | Kumar ..................... | 375/150 |
| 6,075,569 A | 6/2000 | Lee et al. | |
| 6,118,825 A | 9/2000 | Ikeda et al. | |
| 6,208,643 B1 | 3/2001 | Dieterich et al. | |
| 6,490,002 B1 | 12/2002 | Shintani | |
| 6,519,298 B1 | 2/2003 | Kim | |
| 6,690,738 B1 | 2/2004 | Swenson et al. | |
| 6,697,098 B1 | 2/2004 | Wang | |

(Continued)

FOREIGN PATENT DOCUMENTS

KR    2000-0018531 A    4/1997

(Continued)

OTHER PUBLICATIONS

U.S. Appl. No. 60/198,014, Bretl et al.

*Primary Examiner*—Kevin Burd
*Assistant Examiner*—Freshteh Aghdam
(74) *Attorney, Agent, or Firm*—Lee, Hong, Degerman, Kang & Schmadeka

(57) ABSTRACT

A digital VSB transmission system in disclosed. The system is compatible with the existing ATSC 8T-VSB receiver and able to transmit additional supplemental data as well as MPEG image/sound data. It initially encodes the information bit of the supplemental data with a ½ encoding rate in order to produce a parity bit and sends the parity bit together with the information bit. Therefore, both of the MPEG image/sound data and the supplemental data can be transmitted properly even through a channel having a high ghost and/or noise level. Particularly, it can significantly improve performances of the slicer predictor and trellis decoder of the VSB receiver.

6 Claims, 8 Drawing Sheets

U.S. PATENT DOCUMENTS

| | | |
|---|---|---|
| 6,704,366 B1 * | 3/2004 | Combes et al. ............. 375/260 |
| 6,708,149 B1 | 3/2004 | Turin |
| 6,724,832 B1 | 4/2004 | Hershberger |
| 6,743,025 B2 | 6/2004 | Howard |
| 6,744,822 B1 * | 6/2004 | Gaddam et al. ............ 375/265 |
| 6,760,077 B2 | 7/2004 | Choi et al. |
| 6,788,710 B1 * | 9/2004 | Knutson et al. ............ 370/535 |
| 2002/0085632 A1 | 7/2002 | Choi et al. |
| 2004/0207757 A1 * | 10/2004 | Fimoff ........................ 348/555 |
| 2004/0240590 A1 | 12/2004 | Cameron et al. |

FOREIGN PATENT DOCUMENTS

| | | |
|---|---|---|
| KR | 2000-0028757 A | 5/2000 |

\* cited by examiner $g_i, h_i \in \{0,1\}, i=1...M-1$

DIGITAL VSB TRANSMISSION SYSTEM

BACKGROUND OF THE INVENTION

1. Field of the Invention

The present invention relates to a digital communication system, and more particularly, to a vestigial sideband (VSB) transmission system.

2. Background of the Related Art

The Advanced Television Systems Committee (ATSC) has selected the 8 Trellis-Vestigial Sideband (8T-VSB) modulation method as a standard in 1995 for the U.S. digital terrestrial television broadcasting, and the actual broadcasting incorporating the method has started since the second half of the year 1998. FIG. 1 illustrates an existing ATSC 8T-VSB transmitting system. It includes a data randomizer 1, a Read-Solomon encoder 2, a data interleaver 3, a trellis encoder 4, a multiplexer 5, a pilot inserter 6, a Vestigial Sideband (VSB) modulator 7, a radio frequency (RF) converter 8, and an antenna 9. First of all, the data randomizer 1 randomizes the input data received and outputs the randomized data to the Read-Solomon encoder 2. Then the Read-Solomon encoder 2 encodes (Read-Solomon encoding) the randomized data and adds a 20 bytes parity code. Next, the data interleaver 3 interleaves the data, and the trellis encoder 4 converts the interleaved data into symbols and performs trellis encoding. After the multiplexer 5 multiplexes the trellis encoded data and the sync signals, the pilot inserter 6 adds a pilot signal to the multiplexed symbols. Thereafter, the VSB modulator 7 modulates the symbols to 8T-VSB signals and outputs them to the RF converter 8. Finally, the RF converter 8 converts the 8T-VSB signals into RF signals, and the RF signals get transmitted to a receiving system.

FIG. 2 illustrates an existing ATSC 8T-VSB receiving system. It includes a demodulator 11, a comb filter 12, a slicer predictor 14, a channel equalizer 13, a phase tracker 15, a trellis decoder 16, a data deinterleaver 17, a Read-Solomon decoder 18, and a data derandomizer 19. Initially, the demodulator 11 converts the RF signals received through an antenna 10 into baseband signals. Then the comb filter 12 eliminates the NTSC interference signals from the baseband signals, and the channel equalizer 13 compensates the distorted channels using the slicer predictor 14. Thereafter, the phase tracker 15 tracks the phases of the received signals. Next, the trellis decoder 16 decodes the trellis encoded signals, and the data deinterleaver 17 deinterleaves the output of the trellis decoder 16. Finally, the Read-Solomon decoder 18 decodes the deinterleaved data, and the derandomizer 19 derandomizes the decoded signals.

It is very important to note that the ATSC 8T-VSB receiver can receive only MPEG (Moving Picture Experts Group) data, but not any other additional data such as program execution files or certificate information. In other words, the ATSC 8T-VSB transmission/receiving systems are only for MPEG image or sound data. In order to satisfy various demands of many users (viewers), the system should be able to send or receive various supplemental information as well as the image/sound data through digital broadcasting channels.

In addition, it is expected that some of the users will have to use a portable device or a personal computer (PC) card attached with a simple antenna in order to receive the supplemental data. In a case when a system receives data in a room, the data reception performance is generally poor due to the noises and ghosts resulted from reflected waves and many others. It is important to note that the supplemental data transmission must have a lower error rate compared to the image/sound data transmission. That's because even one bit error can create a very serious problem. Therefore, the system must be able to overcome the ghosts and noises generated in the channel.

Normally, the supplemental data will be transmitted together with the MPEG image/sound data using a time-sharing method. However, many ATSC VSB digital broadcasting receivers that can receive only the MPEG data are already on the market. Therefore, the supplemental data subjected to be transmitted with the MPEG data should not have any effect on the old receivers for receiving the MPEG data. In other words, the supplemental data broadcasting system should be compatible with the existing ATSC VSB systems.

SUMMARY OF THE INVENTION

Accordingly, the present invention is directed to a digital VSB transmission system that substantially obviates one or more problems due to limitations and disadvantages of the related art.

An object of the present invention is to provide a digital VSB transmission system that can multiplex MPEG image/sound data and supplemental data and send them through a same digital broadcasting channel.

Another object of the present invention is to provide a digital VSB transmission system that can send the supplemental data and being compatible with the prior ATSC 8T-VSB receiving systems.

Another object of the present invention is to provide a digital VSB transmission system that is robust from noises and ghosts generated in a channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital VSB transmission system includes a supplemental data processor processing input supplemental data including encoding, inserting a null sequence, and inserting an MPEG header; a multiplexer multiplexing said supplemental data processed in said supplemental data processor and MPEG data; a first encoding part processing said multiplexed data including data randomizing, adding a first parity, data interleaving, and byte-symbol converting; and a second encoding part encoding said data processed in said first encoding part with a 1/N coding rate if said first encoding part receives said supplemental data from said multiplexer, N being a natural number.

The system further includes a decoding part processing said data encoded in said second encoding part including symbol-byte converting, data deinteleaving, and eliminating said first parity added in said first encoding part; and a VSB transmitter processing said data processed in said decoding part including trellis encoding, adding a second parity, data interleaving, VSB modulating, and transmitting to a receiving side.

The second encoding part of the VSB transmission system includes a first selecting element selecting a first register value stored in a first register when said supplemental data are received and otherwise selecting a second register value stored in a second register; a first register storing said selected value in said first selecting element for a first predetermined period; an adder adding said stored value in said first registered and an information bit of said supplemental data; a second selecting element selecting a said added value when said supplemental data are received and otherwise selecting said second register value stored in said second register; a second register storing said selected value in said second selecting element for a second predetermined period; and a third selecting element selecting said value stored in said second register when said supplemental data are received and otherwise selecting a lower input bit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 3:
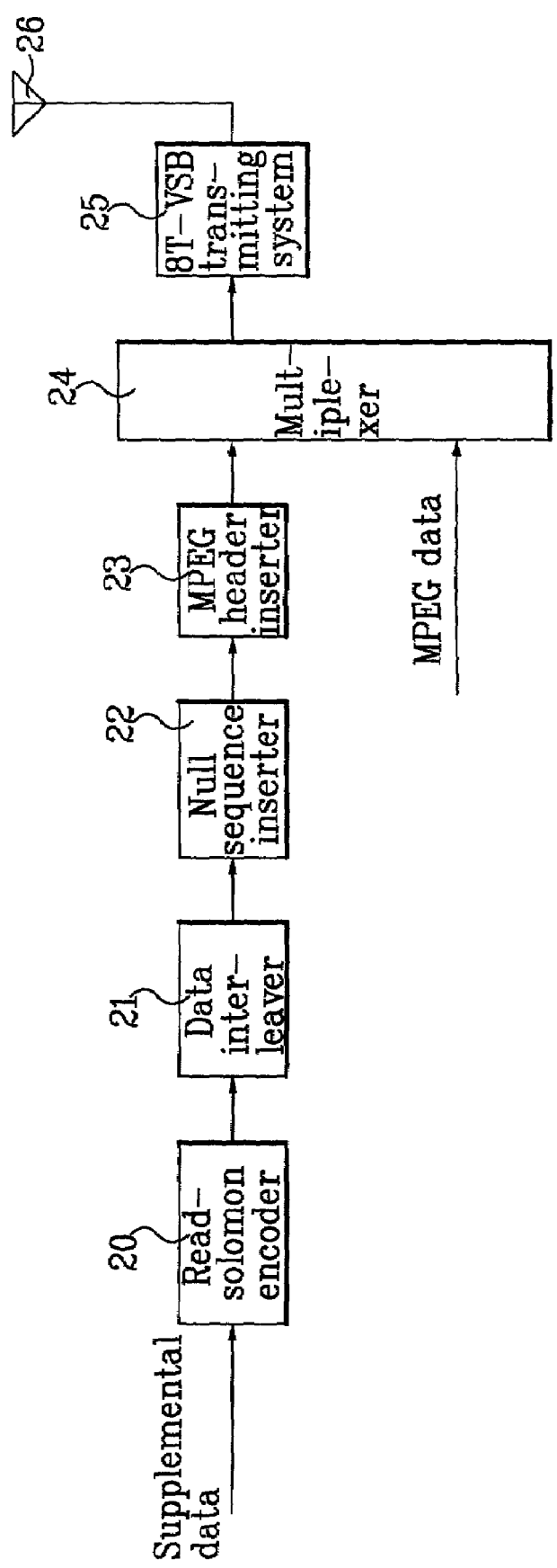
FIG. 3 illustrates a digital VSB transmission system according to the present invention.

FIG. 3 illustrates a VSB (Vestigial Sideband) transmission system for digital television broadcasting according to the present invention. The Read-Solomon encoder (20), data interleaver (21), null sequence inserter (22), and MPEG header inserter (23) process the input supplemental data in order to make their structures to be identical to the MPEG transport packets. That is, the Read-Solomon encoder (20) encodes the supplemental data and adds a 20 bytes parity code, and the data interleaver (21) interleaves the data in order to make the data to be robust from noises and ghosts. Then the null sequence inserter (22) inserts a null sequence to the data to obtain a good data reception capability even in a poor channel environment.

Figure 1:
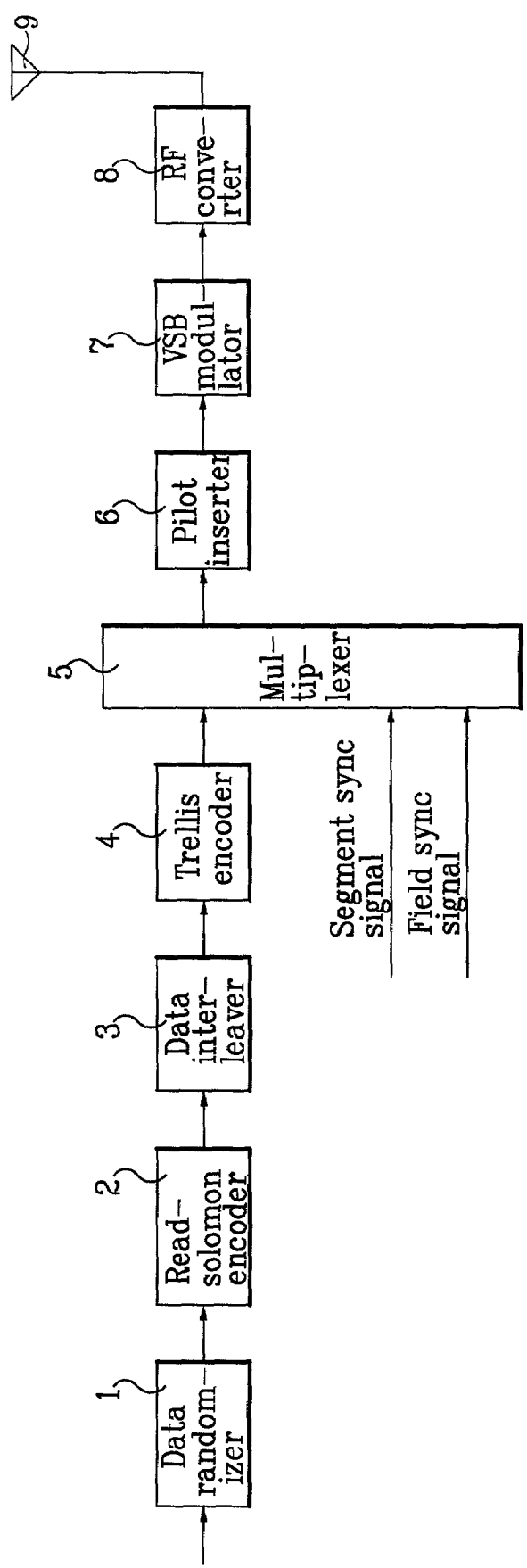
FIG. 1 illustrates an existing ATSC 8T-VSB transmitter according to the related art.
Figure 2:
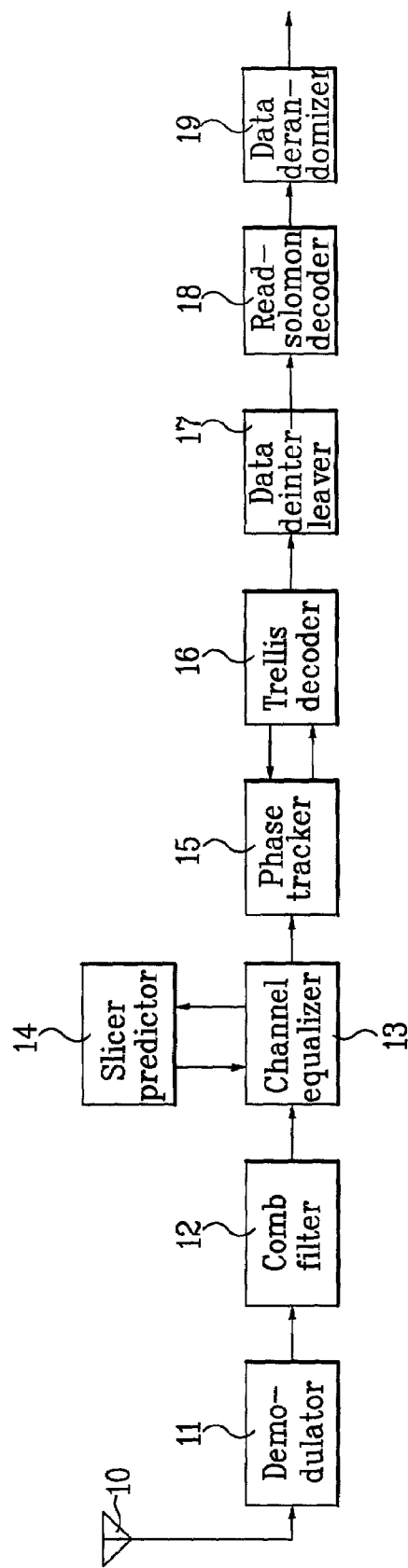
FIG. 2 illustrates an existing ATSC 8T-VSB receiver according to the related art.
Figure 4:
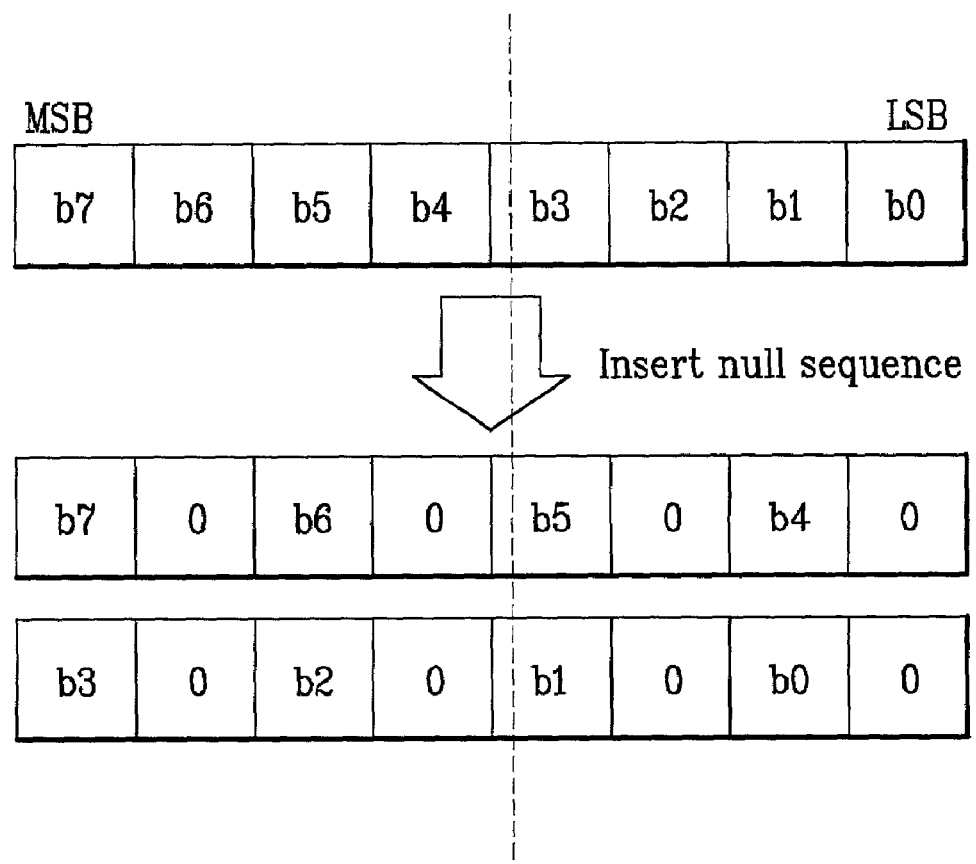
FIG. 4 is a diagram illustrates a null sequence insertion.

FIG. 4 illustrates a process of adding a predetermined sequence to the supplemental data by the null sequence inserter (22) of FIG. 3. As shown in FIG. 4, when each bit of the supplemental data is inputted, one null bit is inserted. Therefore, a total of two bits are output. On the other hand, the MPEG header inserter (23) inserts a 3 bytes MPEG header in order to make the supplemental data to have the formats identical to the MPEG transport packets. Then the supplemental data are time-division multiplexed with the MPEG image/sound data by the multiplexer (24), and the multiplexed data are output to the 8T-VSB transmission system (25). The structure of the 8T-VSB transmission system (25) is shown in FIG. 1.

According to the FIG. 3, the 164 bytes supplemental data packet converts to a 184 bytes packet after Read-Solomon encoding. After null sequences are inserted by the null sequence inserter (22), two packets of 184 bytes data are generated. Thereafter, when the header inserter (23) adds a 3 bytes MPEG transport header to each packet, two 187 bytes packets get output to the multiplexer (24). The packets are then multiplexed with the MPEG transport packets in segment units and are transmitted through the 8T-VSB transmission system (25).

The null bits inserted in the supplemental data are randomized and Read-Solomon encoded in the 8T-VSB transmission system (25). After the encoded supplemental data are interleaved, they are inputted as d0 to the trellis encoder 4 of the VSB transmitting system shown in FIG. 1. For the convenience, the row (line) number of the null bit being inputted to the trellis encoder will be called as a predefined sequence.

Figure 5:
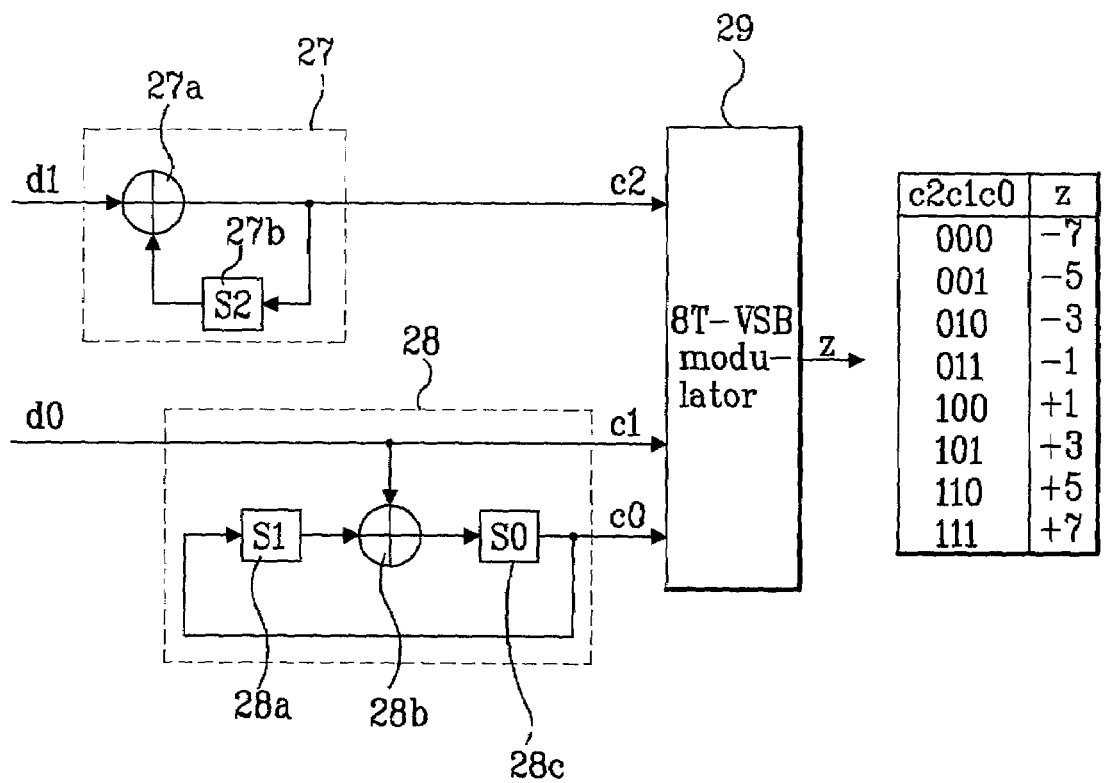
FIG. 5 illustrates a trellis encoder and a precoder of the VSB transmission system shown in FIG. 3.

FIG. 5 illustrates a trellis encoder (28) and a precoder (27) used in the ATSC 8T-VSB transmission system (25) shown in FIG. 3. They receive two input bits d0 and d1 and generate the corresponding output bits c0, c1, and c2. The 8T-VSB modulator (29) generates a modulation value (z) based on c0, c1, and c2. In FIG. 5, 27a and 28b are adders, and 27b, 28a, and 28c are registers. As it is shown in the figure, the input bit d1 is precoded in the precoder (27) to become c2, and the input bit d0 becomes c1. In addition, the output bit c0 is determined based on the register values S0 and S1. Thereafter, the modulation value (z) of the 8T-VSB modulator (29) is determined based on c0, c1, and c2.

The 8T-VSB receiving system, which is not able to receive the supplemental data, selects and receive only MPEG transport packets using the Packet Identification (PID) included in the transport packet header. It discards the supplemental data packets. The receiving system being able to receive the supplemental data demultiplexes the MPEG transport data and supplemental data and processes the supplemental data packets only.

According to the present invention, instead of transmitting the predefined sequence, the supplemental data being inputted as d1 to the trellis encoder are encoded with a ½ rate encoder, and the corresponding output bits are inputted as d1 and d0 to the trellis encoder. By doing so, the system can have an even larger encoding gain. In other words, an information bit being inputted as d1 is initially encoded with a ½ rate encoder. Then one of the output bits generated from the encoder is transmitted as d1 to the trellis encoder, and the other output bit (parity bit) is transmitted as d0. Since the trellis encoder encodes the parity bit encoded with a ½ rate, a convolutional encoder can be used for ½ rate encoding.

Since the parity bit of the ½ encoded symbol cannot be used as a training sequence in the 8T-VSB receiving system, it is desirable that the system uses a convolutional encoder having the feedback structure. The existing ATSC 8T-VSB receiving system eliminates the ghost and improves the performance of the slicer predictor of the channel equalizer by estimating the register value s0 of the trellis encoder shown in FIG. 4. If a convolutional encoder having the feedback structure is used in the present invention, a better prediction performance of the slicer predictor can be achieved.

Figure 6:
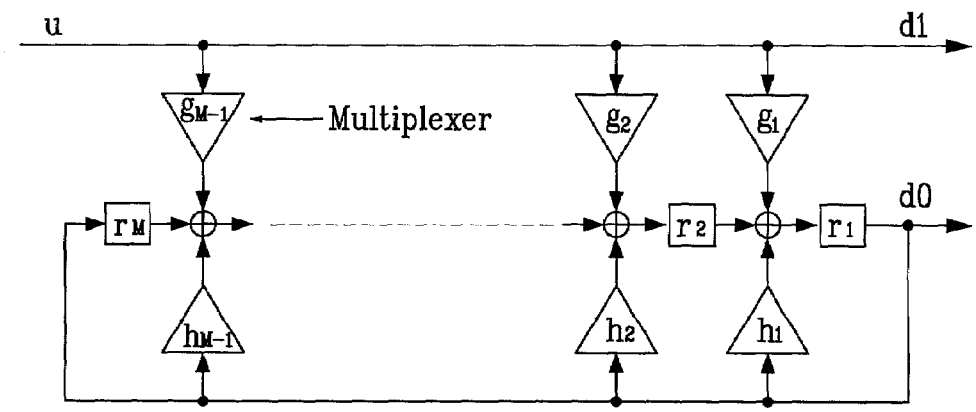
FIG. 6 illustrates a typical ½ rate convolutional encoder having a feedback structure.

FIG. 6 illustrates a typical ½ rate convolutional encoder having M registers. The information bit u is directly output as an output bit d1, and the register r1's value becomes the parity bit d0.

Figure 7:
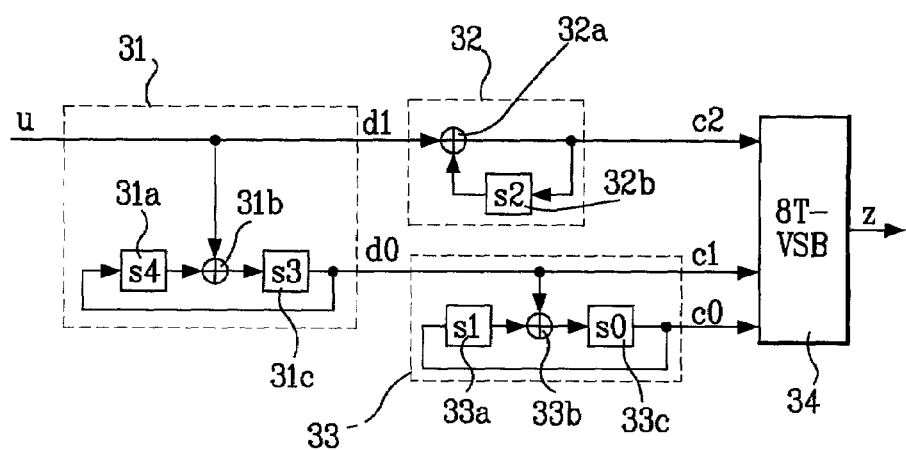
FIG. 7 illustrates a ½ rate convolutional encoder and a trellis encoder of the VSB transmission system according to the present invention.

FIG. 7 illustrates a trellis encoder and a ½ rate convolutional encoder having two registers. A parity bit is generated when the ½ rate convolutional encoder encodes the supplemental data information bit u. Thereafter, the information bit u and the parity bit are inputted to the trellis encoder as d1 and d0. The convolutional encoder must encode only the supplemental data symbol including a null bit. Therefore, the ½ rate convolutional encoder shown in FIG. 7 should have the structure shown in FIG. 8. In a case where the input symbol is the supplemental data symbol including a predefined sequence, the input bit becomes d1, and the parity bit obtained by convolutionally encoding d1 becomes d0. Otherwise, the input bits become d1 and d0. In addition, there are 12 convolutional encoders used in the system, each being used for each trellis encoder.

Figure 8:
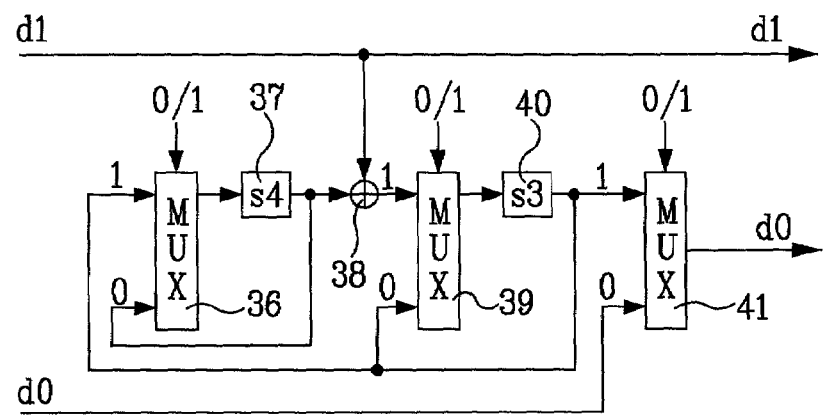
FIG. 8 illustrates a ½ rate convolutional encoder of the VSB transmission system according to the present invention.

According to FIG. 8, each convolutional encoder includes a first multiplexer 36 for selecting one of feedback values, a first register 37 for storing the selected value, an adder 38 for adding d1 and the first register value s4, a second multiplexer 39 for selecting one of the adder output or a feedback register value s3, a second resister 40 for storing the value selected in the second multiplexer 39, and a third multiplexer 41 for outputting s3 or d0.

If the input symbol is not the supplemental data, the values stored in the registers should not be changed based on the input d1. This means that each register should maintain its value by receiving and restoring its own value. A control signal inputted to the multiplexer 36, 39 and 41 indicates whether the input symbol is a supplemental data symbol. For example, let's assume that the control signal is 1 if the input symbol is the supplemental data, and 0 for otherwise. If the control signal is 1, the first multiplexer 36 outputs the value stored in the second register 40 to the first register 37. Otherwise, it outputs the value stored in the first register 37. In addition, the second multiplexer 39 outputs the value received from the adder 38 if the control signal is 1. Otherwise, it outputs the value stored in the second register 40. The third multiplexer 41 outputs the value stored in the second register 40 to the trellis encoder as d0 if the control signal is 1. If it is 0, it outputs the input bit d0 to the trellis encoder.

Figure 9:
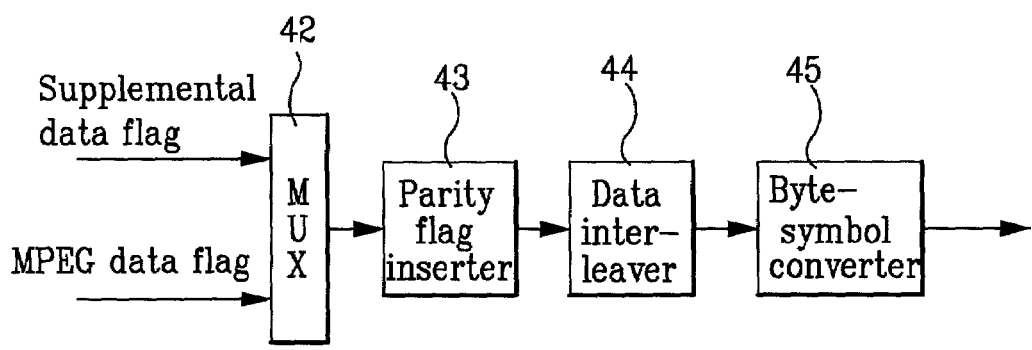
FIG. 9 illustrates a supplemental data symbol indicator of the VSB transmission system according to the present invention.

FIG. 9 illustrates a supplemental data symbol indicator according to the present invention. It assigns a bit flag for each input data byte. The value of the flag for supplemental data is different from that for non-supplemental data. For example, if the input data are the supplemental data packets, the 3 bits flag corresponding to the MPEG header becomes 0, and for other bytes including a null bit, the flag is set to 1. On the other hand, if the input data are the MPEG transport packets, the flag for each byte is set to 0. Therefore, for the supplemental data, three flags are set to 0, and all other 184 flags are set to 1. For the MPEG data, all of 187 flags are set to 0. Then a control signal is generated based on the values of the flags.

For example, since the multiplexer 24 shown in FIG. 3 can determine whether the input data correspond to either the supplemental data packets or MPEG data packets, the control signal can be generated between the multiplexing step performed by the multiplexer 24 and the byte-symbol converting step. In other words, as shown in FIG. 9, the data flags multiplexed in the multiplexer 42 are output to a parity flag inserter 43 without passing through a data randomizer. The flag values of the 20 parity bytes being inserted are set to 0 in the parity flag inserter 43, and the flags are interleaved in the data interleaver 44. Finally, when the flags convert to corresponding symbols, a control signal corresponding to the symbols is generated.

Since the predefined sequence of the supplemental data symbol converts to a parity bit, error occurs when the supplemental data packets are decoded in the Read-Solomon decoder in the existing ATSC 8T-VSB receiving system. In order to avoid such errors, the Read-Solomon parity byte corresponding to the data converted by the ½ convolutional encoder must be recalculated. That is, the Read-Solomon parity byte added to the original supplemental data (before ½ convolutional encoding) must be deleted, and the Read-Solomon parity byte must be added to the convolutionally encoded supplemental data. For this reason, the initial Read-Solomon parity must be deleted after performing the symbol-byte converting and data deinterleaving on the output from the ½ convolutional encoder. Then the ATSC 8T-VSB transmitting system, in which the data randomizer is not employed, adds a Read-Solomon parity by Read-Solomon encoding. Since the Read-Solomon parity being added corresponds to the convolutionally encoded data with a ½ rate, the ATSC 8T-VSB receiving system is able to Read-Solomon decode the data without any error. This process is shown in FIG. 10.

Figure 10:
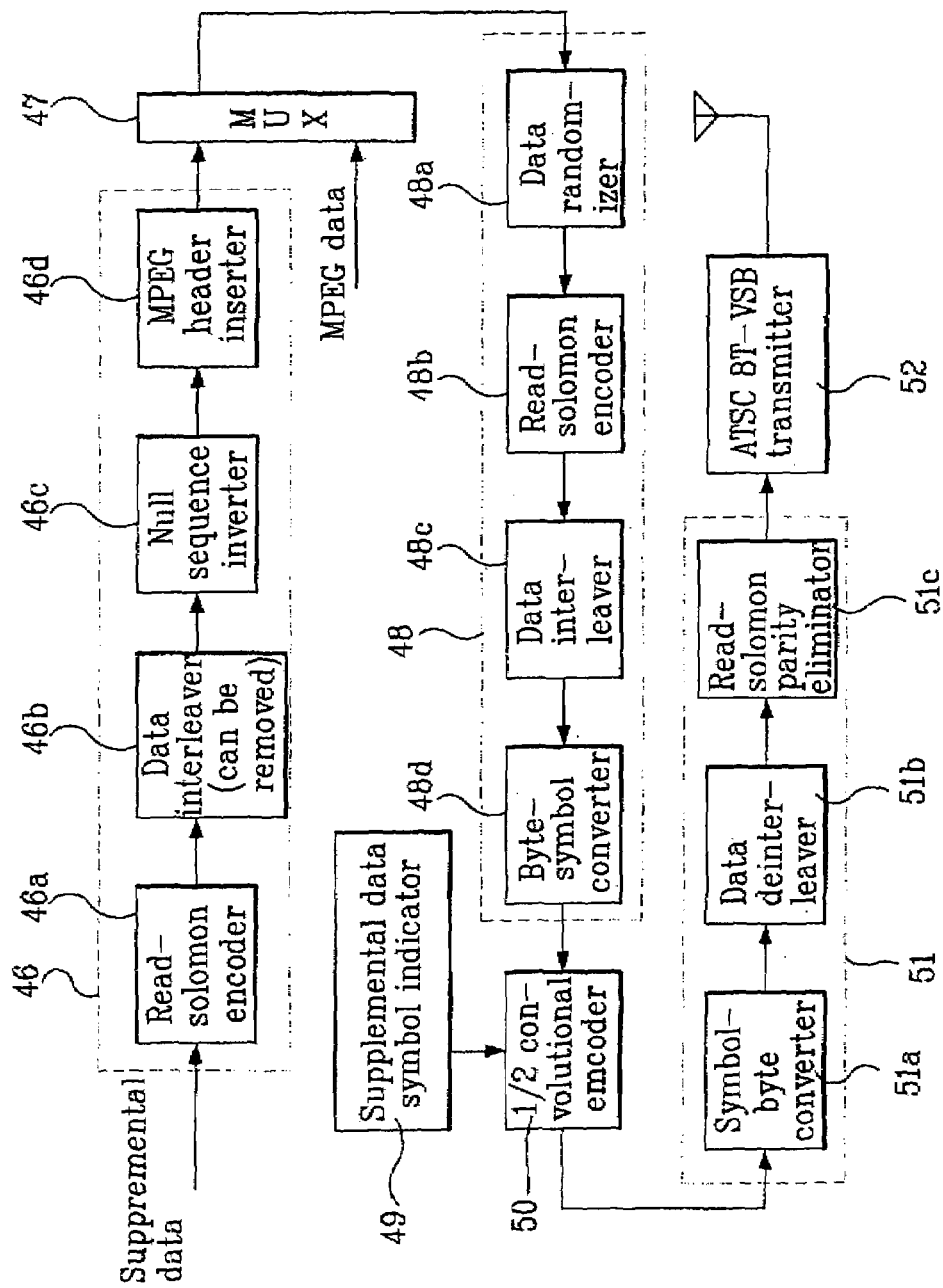
FIG. 10 illustrates a digital VSB transmission system according to the present invention.

FIG. 10 is a block diagram illustrating each part of a digital VSB transmitting system according to the present invention. According to FIG. 10, the system includes a supplemental data processor 46, a multiplexer 47, a first encoding element 48, a supplemental data symbol indicator 49, a convolutional encoder 50, a first decoding part 51, and an existing 8T-VSB transmitting system wherein the data randomizer is not employed.

The supplemental data processor 46 encodes (Read-Solomon encoding) the supplemental data and inserts a null sequence and a MPEG header. The multiplexer 47 outputs the MPEG data packets or the supplemental data packets received from the supplemental data processor 46. The first encoding element 48 carries out an operation of processing the packets received from the multiplexer 47 including data randomizing, Read-Solomon encoding, data interleaving, and byte-symbol converting. The supplemental data symbol indicator 49 indicates whether the symbols output from the first encoding part 48 are supplemental data symbols. If the control signal generated from the indicator 49 indicates that they are the supplemental data symbols, the convolutional encoder 50 then performs an operation of ½ rate convolutional encoding on the symbols. The first decoding part 51 carries out an operation of processing the symbols received from the convolutional encoder 50 including symbol-byte converting, data deinterleaving, and Read-Solomon parity eliminating. The 8T-VSB transmitting system 52 performs Read-Solomon encoding, data interleaving, and Trellis encoding. The 8T-VSB transmitting system 52 is same as the system shown in FIG. 1 except that it excludes the data randomizer.

Accordingly, the input supplemental data convert to supplemental data packets having a 20 bytes Read-Solomon parity, a null sequence, and a MPEG header after being processed in a Read-Solomon encoder 46a, a data interleaver 46b (can be removed), a null sequence inserter 46c, and a MPEG header inserter 46d. The multiplexer 47 selects the supplemental data packets or MPEG image/sound data packets and outputs the selected packets to the first encoding part 48.

The first encoding element 48 and the first decoding part 51 of the system eliminate the Read-Solomon parity inserted before the supplemental data are encoded by the convolutional encoder 50. In other words, the data randomizer 48a of the first encoding element 48 randomizes the data packets received from the multiplexer 47, and the Read-Solomon encoder 48b adds a 20 bytes parity by Read-Solomon encoding. The data interleaver 48c performs data interleaving on the data including the parity, and the interleaved data are output to the byte-symbol converter 48d. The byte-symbol converter 48d converts the interleaved data to the two bits symbols and outputs them to the convolutional encoder 50.

The convolutional encoder 50 performs ½ rate convolutional encoding based on the control signal generated from the supplemental data symbol indicator 49. The details of this part are explained earlier using FIG. 6 and FIG. 9.

The data outputting from ½ convolutional encoder 50 are inputted to the symbol-byte converter 51a and converted to the data in byte units. Then the data deinterleaver 51b deinterleaves the data and the Read-Solomon parity eliminator 51c eliminates the Read-Solomon parity, which is added in the Read-Solomon encoder 48b, and outputs the data to the ATSC 8T-VSB transmitter 52. The 8T-VSB transmitter 52 then performs processes shown in FIG. 1 starting from the Read-Solomon encoding step.

The supplemental data symbol indicator 49 can have its own elements such as a multiplexer, a Read-Solomon encoder, a data interleaver, and a byte-symbol converter, or it can simply use the multiplexer 47 and the first encoding part 48. In such case, bit lines for the flag must be added to each block of the multiplexer 47 and the first encoding part 48.

The ATSC 8T-VSB receiving system performs the reverse-processes on the supplemental data and the MPEG data received. Particularly, the receiving system can estimate register values of the convolutional encoder for predicting c1 and c0 values for the next symbol, and the channel equalizer can use the 2 level slicer having a level distance being four times than that of the 8 level sliver by using the estimated values.

Therefore, the robustness of the receiving system against the channel ghost and noise signals can be greatly improved, and the slicer predictor and trellis decoder of the receiving system can have improved performances. In other words, using a slicer having larger distances between signals will minimize the signal errors. This is because the system is less influenced by the ghost and noise signals as the signal level distances become larger.

In addition, the VSB transmitting system can transmit another set of MPEG image/sound data instead of the supplemental data. In this case, the receiver will be able to adequately receive the data even in a poor environment. The channel should be time divided so that the MPEG data having a better quality can be transmitted through the channel when the channel environment is good.

As it is shown above, the advantages of the digital VSB transmitting system according to the present invention are as follows. First of all, the system is still compatible with the existing ATSC 8T-VSB receiving system while sending the additional supplemental data and the MPEG data after multiplexing. Second, by transmitting the information bit of the supplemental data with the parity bit generated by encoding the information bit, the MEPG image/sound data or supplemental data can be transmitted properly even in a channel having large noise or ghost signals. Finally, by generating the parity bit by encoding the supplemental data information bit with a ½ rate, a greater coding gain can be obtained. Particularly, the performances of the slicer predictor and the trellis decoder can be greatly improved.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A Vestigial Sideband (VSB) transmission system comprising:
   a supplemental data processor processing input supplemental data including encoding, inserting a null sequence, and inserting an MPEG header;
   a multiplexer multiplexing said supplemental data processed in said supplemental data processor and MPEG data;
   a first encoding part processing said multiplexed data including data randomizing, adding a first parity, data interleaving, and byte-symbol converting;
   a second encoding part encoding said data processed in said first encoding part with a 1/N coding rate if said first encoding part receives said supplemental data from said multiplexer, N being a natural number;
   a decoding part processing said data encoded in said second encoding part including symbol-byte converting, data deinteleaving, and eliminating said first parity added in said first encoding part; and
   a VSB transmitter processing said data processed in said decoding part including trellis encoding, adding a second parity, data interleaving, VSB modulating, and transmitting to a receiving side.

2. The VSB transmission system of claim 1, wherein said second encoding part is a ½ rate convolutional encoder.

3. The VSB transmission system of claim 2, wherein said second encoding part convolutionally encodes information bits of said supplemental data with a ½ coding rate in order to produce a parity bit and outputs non-coded information bits and said parity bit to a trellis encoder of said VSB transmitter as an upper and lower input bits.

4. The VSB transmission system of claim 1, wherein said second encoding part includes:
   a first selecting element selecting a first register value stored in a first register when said supplemental data are received and otherwise selecting a second register value stored in a second register;
   a first register storing said selected value in said first selecting element for a first predetermined period;
   an adder adding said stored value in said first registered and an information bit of said supplemental data;

a second selecting element selecting a said added value when said supplemental data are received and otherwise selecting said second register value stored in said second register;

a second register storing said selected value in said second selecting element for a second predetermined period; and a third selecting element selecting said value stored in said second register when said supplemental data are received and otherwise selecting a lower input bit.

5. The VSB transmission system of claim 1, further comprising a supplemental data symbol indicator determining whether said first encoding part receives said supplemental data from said multiplexer and providing a corresponding control signal to said second encoding part.

6. The VSB transmission system of claim 5, wherein said supplemental data symbol indicator assigns a flag bit for each byte of data received from said multiplexer, sets flag values based on the type of said received data, inserts each parity flag, performs data interleaving and byte-symbol converting processes, and generates a corresponding control signal.

* * * * *